United States Patent
Imaizumi et al.

(10) Patent No.: US 6,278,758 B1
(45) Date of Patent: Aug. 21, 2001

(54) SUPPORT GRID FOR A NUCLEAR REACTOR FUEL ASSEMBLY

(75) Inventors: Masahiko Imaizumi, Hyogo-ken; Takayuki Suemura, Tokyo, both of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/266,188

(22) Filed: Mar. 10, 1999

(30) Foreign Application Priority Data

Jul. 8, 1998 (JP) .................................. 10-193237

(51) Int. Cl.[7] .............................. G21C 3/34; G21C 3/352
(52) U.S. Cl. ........................ 376/438; 376/439; 376/442; 376/462
(58) Field of Search ................................... 376/439, 442, 376/462, 438

(56) References Cited

U.S. PATENT DOCUMENTS

| | | | |
|---|---|---|---|
| 3,920,515 | * 11/1975 | Ferrari et al. | 176/78 |
| 4,039,379 | 8/1977 | Patterson et al. | 176/76 |
| 4,268,356 | * 5/1981 | Kmonk et al. | 176/78 |
| 4,389,369 | * 6/1983 | Bryan | 376/442 |
| 4,803,043 | * 2/1989 | DeMario et al. | 376/442 |
| 4,827,063 | 5/1989 | Bokers et al. | 376/439 |
| 4,879,090 | * 11/1989 | Perrotti et al. | 376/462 |
| 5,061,437 | * 10/1991 | Whitt | 376/438 |
| 5,110,539 | * 5/1992 | Perrotti et al. | 376/439 |
| 5,139,736 | * 8/1992 | Bryan | 376/442 |
| 5,180,548 | * 1/1993 | Verdier | 376/439 |
| 5,183,629 | * 2/1993 | Canat et al. | 376/439 |
| 5,188,797 | * 2/1993 | Bryan | 376/438 |
| 5,265,140 | 11/1993 | Perrotti | 376/439 |
| 5,307,393 | 4/1994 | Hatfield | 376/442 |
| 5,371,769 | * 12/1994 | Kato et al. | 376/442 |
| 5,402,457 | * 3/1995 | Suchy et al. | 376/443 |
| 5,440,599 | 8/1995 | Rodack et al. | 376/439 |
| 5,859,887 | * 1/1999 | Richards | 376/438 |
| 6,144,716 | * 11/2000 | Nguyen et al. | 376/442 |

FOREIGN PATENT DOCUMENTS

| | | | |
|---|---|---|---|
| 0304724 | 3/1989 | (EP) . | |
| 0 332 941 | * 9/1989 | (EP) | 376/438 |
| WO9408341 | 4/1994 | (WO) . | |

* cited by examiner

Primary Examiner—Charles T. Jordan
Assistant Examiner—Jack Keith
(74) Attorney, Agent, or Firm—Gottlieb, Rackman & Reisman, P.C.

(57) ABSTRACT

An improved support grid of a nuclear reactor fuel assembly is described. The support grid has a plurality of first and second straps which are assembled so as to form an eggcrate structure defining grid cells in a square arrangement. The support grid includes a plurality of mixing vanes integrally formed on a side edge of the first and second straps adjacent to an area where the straps cross. The mixing vanes slanted to be adjacent to a fuel rod are each shaped to show no welding apertures formed therein in their horizontal planes of projection thereby maximizing the coolant impinging area to agitate and swirl a coolant flow.

1 Claim, 7 Drawing Sheets

SUPPORT GRID FOR A NUCLEAR REACTOR FUEL ASSEMBLY

FIELD OF INVENTION

The present invention relates to a nuclear reactor fuel assembly, and more specifically to a support grid structure for supporting fuel rods thereof.

BACKGROUND OF THE INVENTION

Figure 5:
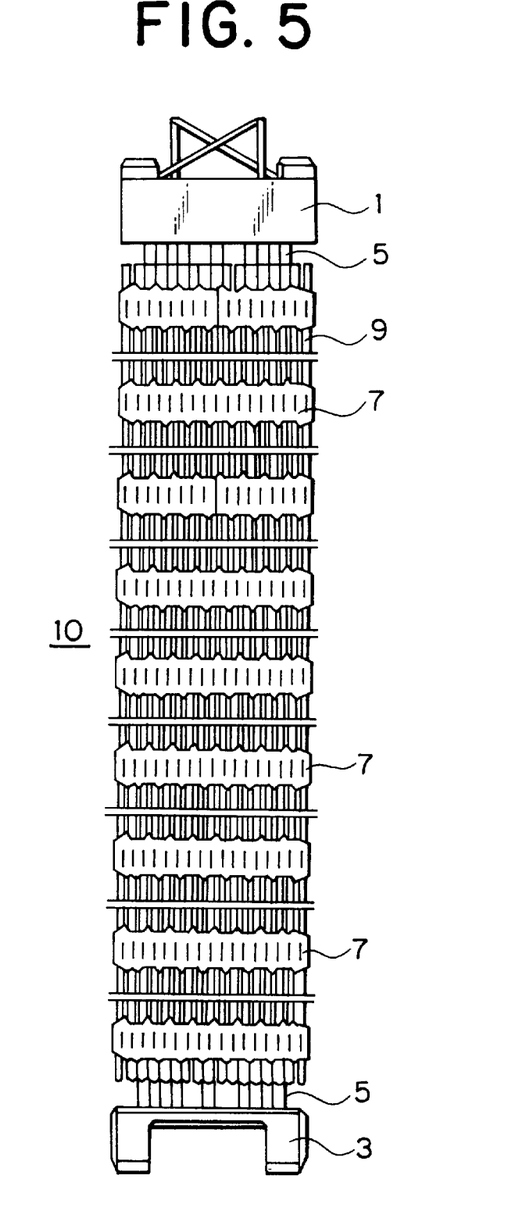
FIG. 5 is a shortened elevational view of a fuel assembly in which a support grid according to the present invention is incorporated.
Figure 6:
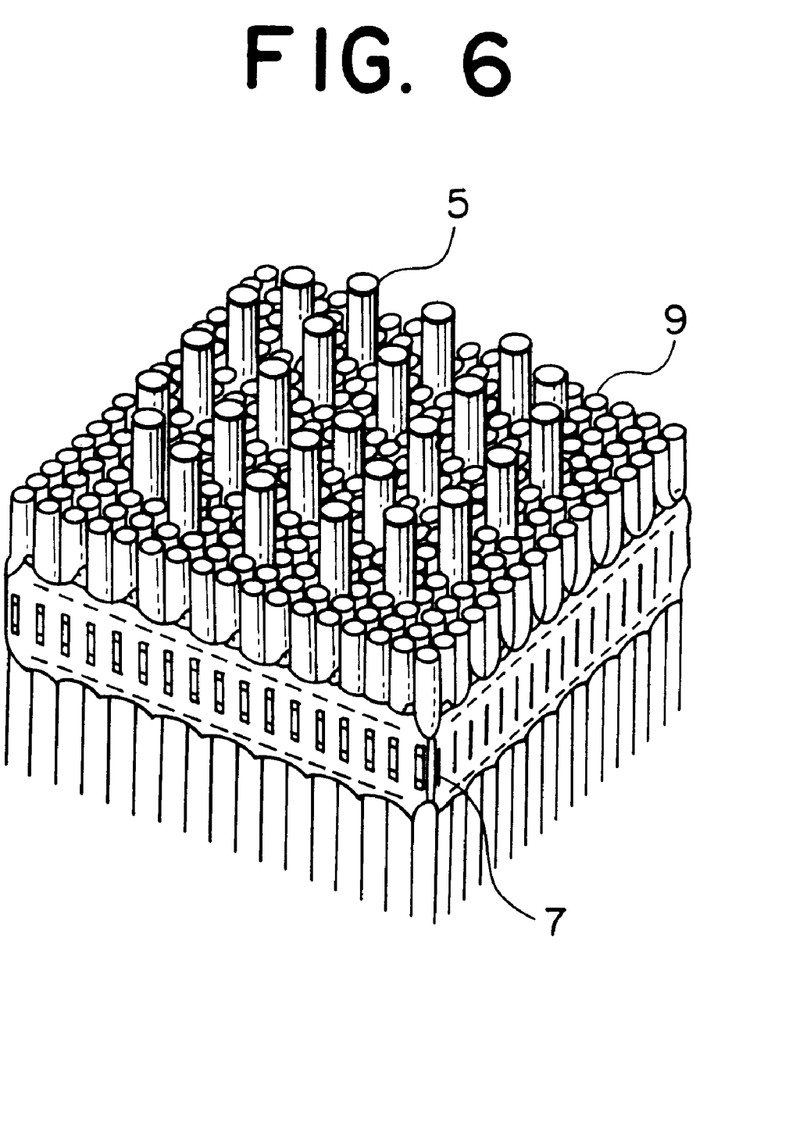
FIG. 6 is a partial perspective view showing a portion cut out from the fuel assembly in FIG. 5.

A typical structure of a fuel assembly for a pressurized water reactor is shown in FIG. 5. Describing it briefly, an upper and lower nozzle 1, 3 having a plurality of coolant flow holes machined therein are connected with a plurality of hollow guide tubes 5 which are parallel to one another. Support grids 7 having grid cells positioned in a rectangular arrangement which individually receive the hollow guide tubes 5 therethrough and which are fixed to the guide tubes 5 support the fuel rods 9 by placing them individually through the remainder of the grid cells. A fuel assembly 10 is thus constructed and in order to more clearly show the structure, a portion of the fuel assembly 10 from which the surroundings about one support grid 7 are removed is shown in a partial perspective view in FIG. 6. As readily understandable from FIG. 6, the disposition of the fuel rods 9 is in a square arrangement with equal numbers of columns and rows and it is constructed showing some of the fuel rods 9 at specified locations being replaced with the hollow guide tubes 5.

Figure 7A:
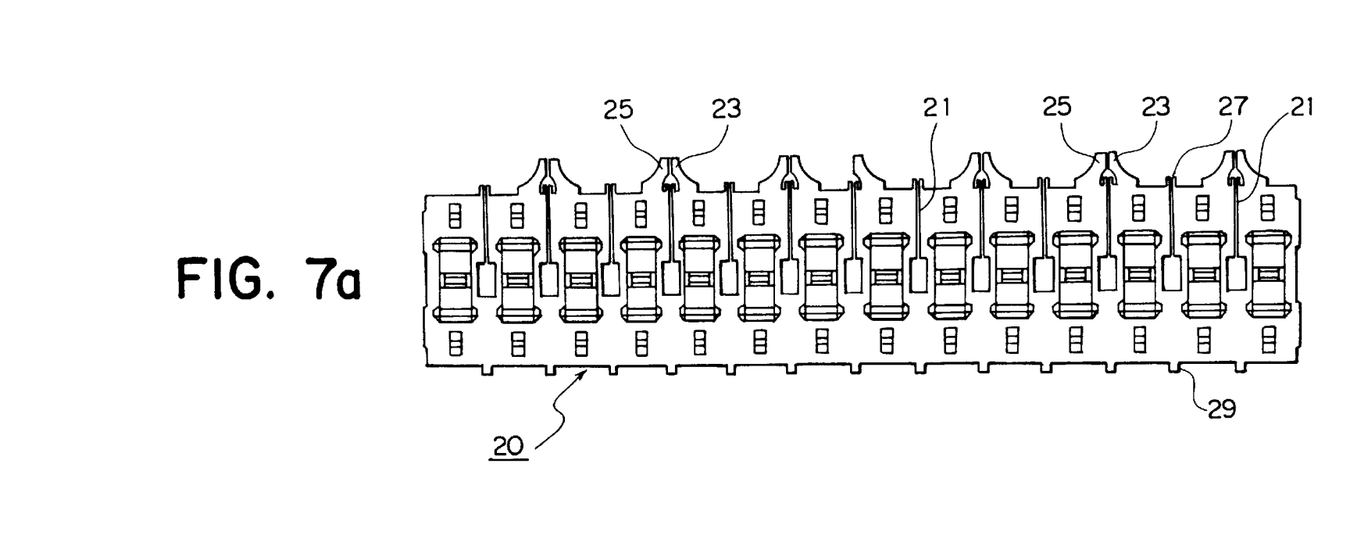
FIG. 7a is a side view showing a shape of a blank for a strap of a conventional support grid.
Figure 7B:
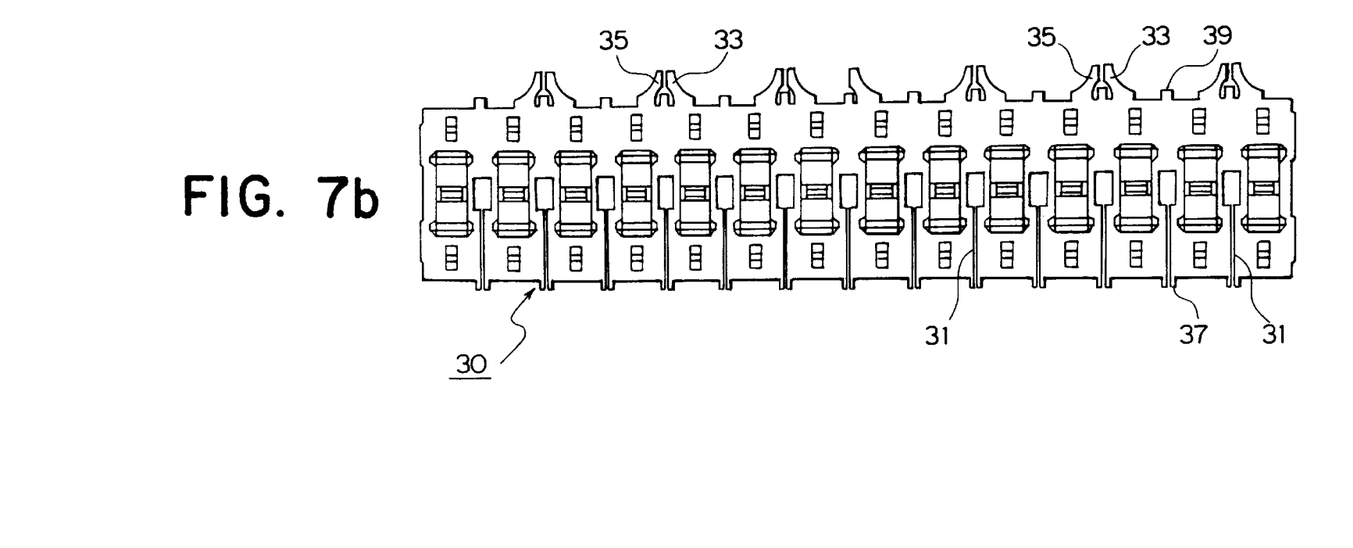
FIG. 7b is a side view showing a shape of a blank for another strap of the conventional support grid.

The support grid 7 defining grid cells which individually receive, as described before, the fuel rods 9 and the hollow guide tubes 5 disposed in a square arrangement, is essentially constructed by combining two kinds of thin metal straps as shown in FIGS. 7a and 7b, namely, straps 20, 30, with each other in a perpendicular relationship. The support grid 7 defines grid cells located in a 14×14 arrangement, and the straps 20, 30 each essentially have an identical configuration and differ from each other in the positions at which slits 21, 31 for receiving another strap corresponding thereto are formed. In other words, slits 21 in the strap 20 are positioned on an upper side (downstream in the coolant flow), while slits 31 in the strap 30 are positioned on a lower side (upstream in the coolant flow). Mixing vanes 23, 25, 33, 35 are integrally formed at a downstream edge of the straps 20, 30 in alignment with the slits 21, 31. Furthermore, tabs 27, 29, 37, 39 for welding the straps 20, 30 which are assembled by using slits 21, 31 are provided. The positional relationship among the slits 21, 31, the mixing vanes 23, 25, 33, 35 and the tabs 27, 29, 37, 39 that are described above is schematically shown in an enlarged manner in FIGS. 5a and 8b.

Figure 9:
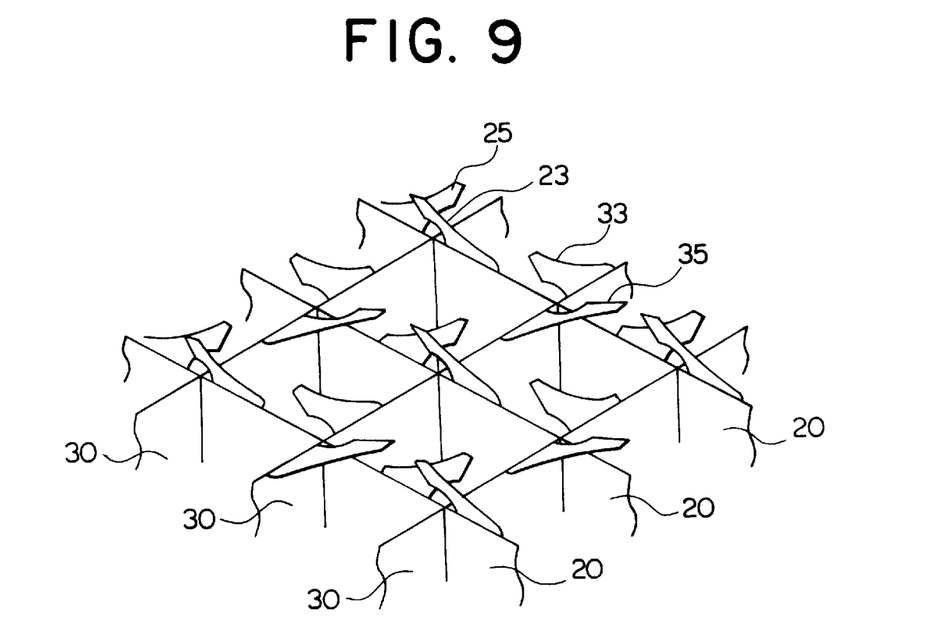
FIG. 9 is a partial perspective view of the conventional support grid.
Figure 10:
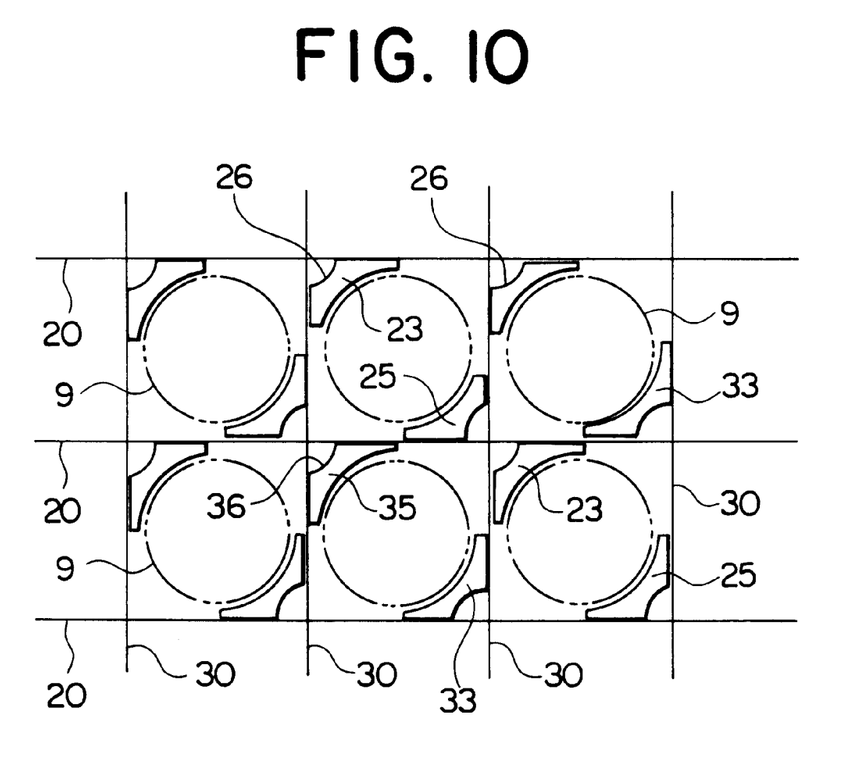
FIG. 10 is a partial top view of the conventional support grid.

The above described mixing vanes 23, 25 and 33, 35 are bent and slanted in opposite directions, respectively, as shown in FIG. 9, when the straps 20, 30 are assembled. A partial top view of the support grid 7 corresponding to FIG. 9 is shown in FIG. 10. As seen from FIG. 10, the outer extremities of the mixing vanes 23, 25, 33, 35 are close to the fuel rods 9 depicted by dash-and-two-dot lines, but not close enough to come into contact with the fuel rods 9. In these structures, since a coolant stream which flows through the support grid 7 impinges on the mixing vanes 23, 25, 33, 55, the coolant stream is agitated to be stirred and make the temperature distribution therein uniform.

SUMMARY OF THE INVENTION

Figure 8A:
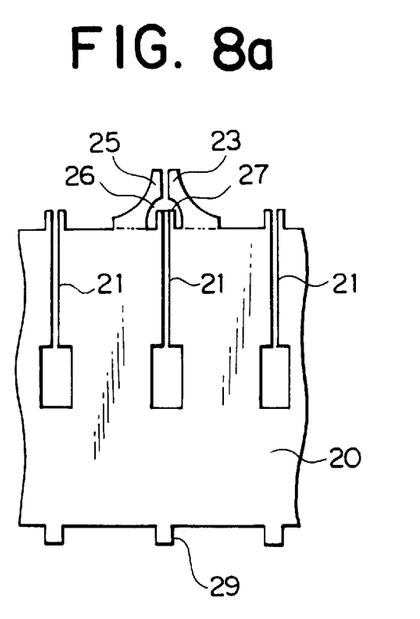
FIG. 8a is a schematic view showing a portion of the strap in FIG. 7a in an enlarged fashion.
Figure 8B:
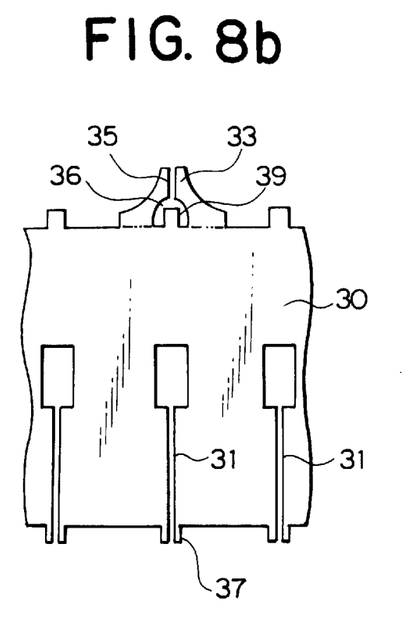
FIG. 8b is a schematic view showing a portion of the strap in FIG. 7b in an enlarged fashion.

However, in the conventional support grid 7, as clearly shown in FIGS. 8 and 10 in particular, welding apertures 26, 36 are formed by an inner side of the mixing vanes 23, 25, 33, 35, respectively. Since the coolant stream passes through these welding apertures 26, 36 without impingement or interference, no agitation of the coolant passing through the welding apertures can be expected and the agitating and mixing function of all the mixing vanes is therefore not sufficient to achieve the desired effects.

Accordingly, an object of the present invention is to provide a support grid with mixing vanes for a fuel assembly which do not increase a pressure drop in the coolant flow and which further provides improved agitating and mixing functions.

In order to accomplish the object described above, according to the present invention, in a support grid of a nuclear reactor fuel assembly wherein the support grid has a plurality of first straps which are made of thin metal band plate, and a plurality of second straps which are made of thin metal band plate, the first and second straps are each provided with slits extending widthwise for receiving the other of the straps and assembled so as to receive opposite straps in the slits of each strap to cross each other and thereby form an eggcrate structure, mixing vanes integrally formed on a side edge of the first and second straps adjacent to a crossed area and in alignment with a slit, each of the mixing vanes being slanted so as to be adjacent to a nuclear reactor fuel rod to be placed through a grid cell of the eggcrate structure, the slanted portion of the mixing vane being shaped so as to maximize an area of the slanted portion of the mixing vane projected onto a plane perpendicular to coolant flow direction. Preferably, the mixing vanes are shaped such that they have a welding aperture formed in a base portion at the side of the slit, and a bend line extending parallel to a longitudinal axis of the strap is located closer to a distal end side than the welding aperture and a curved outer edge of the mixing vanes is located at the distal end side of the bend line. Furthermore, in place of the above, the shape of the mixing vane can be formed such that the bend line at which the slanted surface of the mixing vane begins is slanted with respect to the longitudinal axis of the strap so as to avoid the welding aperture and the length of the mixing vane of the first strap is larger than the length of the mixing vane of the second strap.

DETAILED DESCRIPTION OF THE PREFERRED EMBODIMENT

Figure 1:
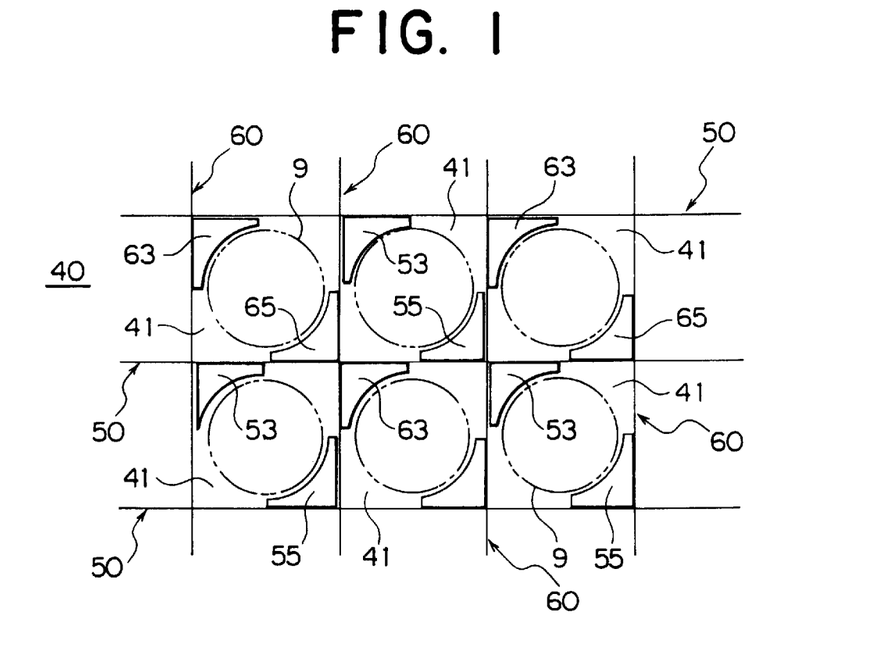
FIG. 1 is a partial plan view showing a preferred embodiment according to the present invention.
Figure 2A:
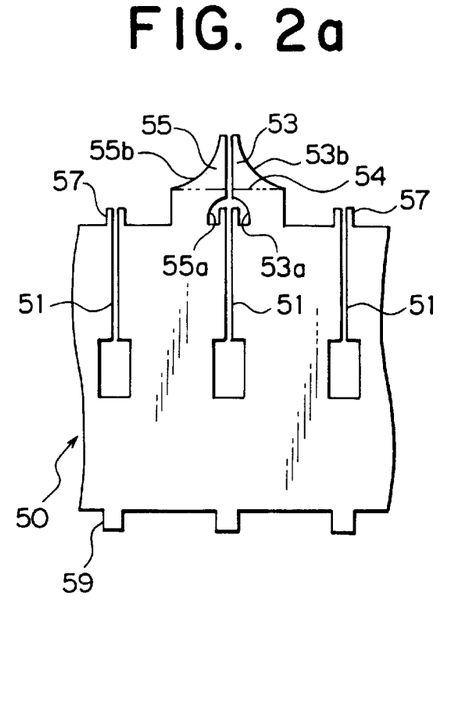
FIG. 2a is a partial side view showing a blank shape for a member used in the preferred embodiment according to the present invention.

A preferred embodiment according to the present invention will be hereinafter described by reference to the accompanying drawings. FIG. 1 is a partial top view of a support grid 40 for a fuel assembly according to the present invention, and a plurality of straps 50, 60 are assembled in a crossed manner as described later so as to define a plurality of grid cells 41 positioned in a rectangular arrangement. In other words, the disposition of the grid cells 41 is a square arrangement such as 14×14, 15×15 and 17×17. Then, fuel rods 9 are individually placed through these grid cells 41 as shown by the dash-and-two-dot Sines and resiliently supported as in conventional grids. Shape of the blanks for the straps 50, 60 are partially shown in FIGS. 2a and 2b, respectively. Describing the structure of the strap 50 by reference to FIG. 2a, slits 51 are formed along an upper side edge of the strap 50 at intervals of a length corresponding to a distance between opposite sides of the grid cell 44. The slits 51 are designed to receive the straps 60 as the other member and extend perpendicular to a longitudinal axis of the strap 50. At an open-end side of the slit 51, a welding tab 57 is protrudingly formed, and another welding tab 59 is formed at the opposite side edge. Mixing vanes 53, 55 are formed at the both sides of the opening of alternate slits 51. Furthermore, welding apertures 53a, 55b are formed in the base end on either side of the slits 51 and outer side ends 53b, 55b are shaped in a curved outline. At the bend line 54 shown by dash-and-two-dot lines, the mixing vanes 53, 55 are individually bent in opposite directions so as to place the outer side ends 53b, 55b close to fuel rods 9 with narrow gaps as shown in FIG. 1.

Figure 2B:
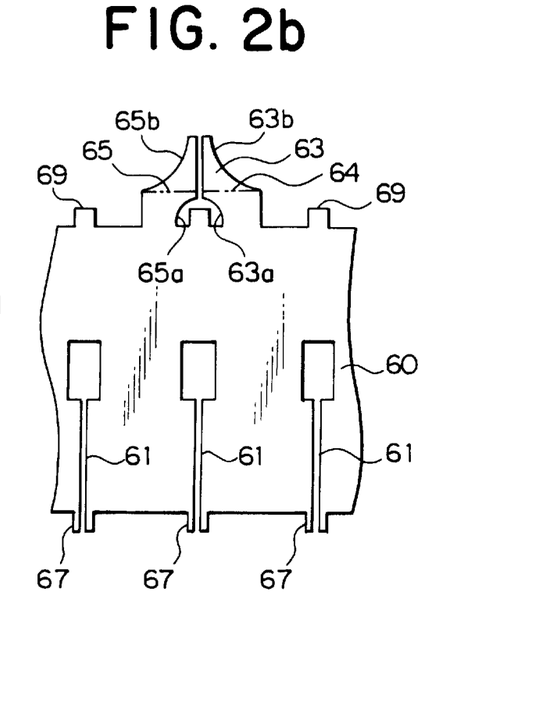
FIG. 2b is a partial side view showing a blank shape for another member used in the preferred embodiment.

The structure of the strap 60 to be joined to the strap 50 is depicted in FIG. 2b. Slits 61 similar to the slits 51 are formed at intervals along a lower side edge thereof. Further, welding tabs 67 are protrudingly formed at the side of open ends of the slits 61. As can be understood from FIG. 1, the slits 51, 61 are each positioned at the crossing portion between the straps 50, 60 and mixing vanes 63, 65 are protrudingly formed at the upper side edge of the strap 60 in alignment with slits 61 corresponding to the slits 51 without the mixing vanes 53, 55. The mixing vanes 63, 65 each have the same shape as that of the mixing vanes 53, 55 and have a weld aperture 63a, 65a and curved outer side ends 63b, 65b and are each to be bent in opposite directions at the bend line 64 during assembly. This state is shown in FIG. 1.

The support grids 40 of the structure as shown in FIG. 1 are joined into a fuel assembly, which is in turn loaded in a nuclear reactor core. During operation of the nuclear reactor, the coolant flows upwards (from the lower portion of the illustration to the top portion in FIGS. 2a and 2b) between the fuel rod 9 and the straps 50, 60 and a portion thereof impinges onto the slanted mixing vanes 53, 55, 63, 65 and caused to swirl, thereby promoting mixing of the coolant. In the aforementioned structure, the bend lines 54, 64 parallel to the longitudinal axis are located above the welding apertures 53a, 55a, 63a, 65a and so the apertures do not show in the horizontal plane of projection as is clear in FIG. 1. In other words, the coolant impinging area of the mixing vanes 53, 55, 63, 65 are larger than in the conventional structure, thereby promoting and increasing agitation and mixing of the coolant.

Figure 3:
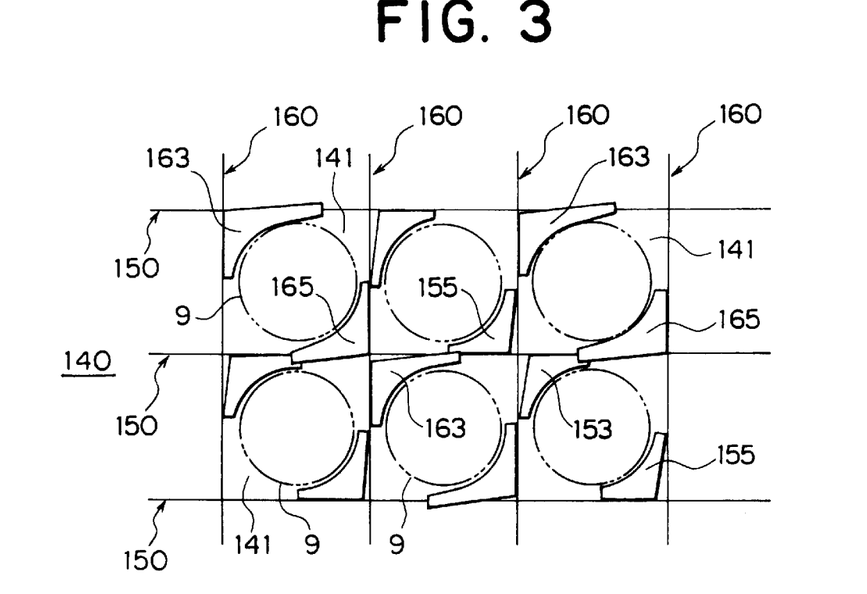
FIG. 3 is a partial top view showing another preferred embodiment.
Figure 4A:
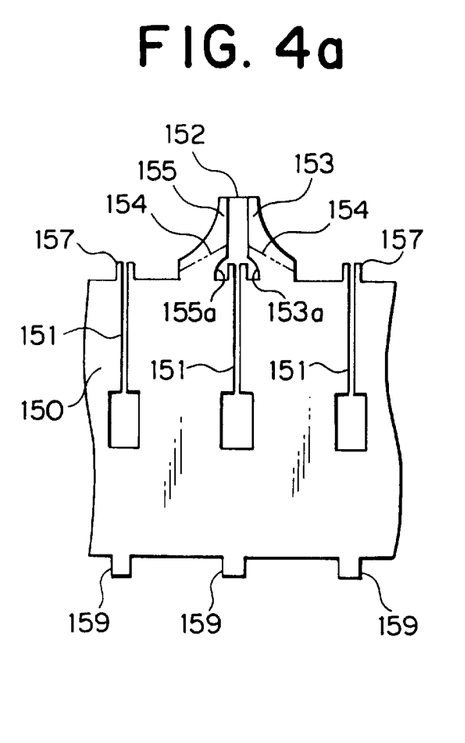
FIG. 4a is a partial side view showing a shape of a blank for a member used in said other embodiment.
Figure 4B:
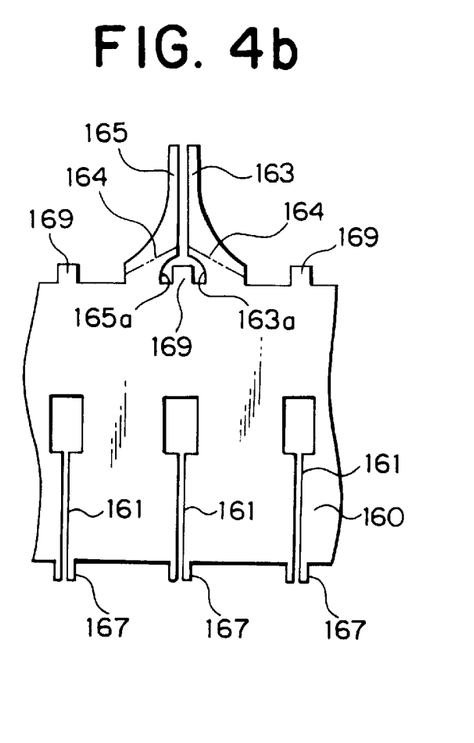
FIG. 4b is a partial side view showing a shape of a blank for another member used in said other embodiment.

Next, another embodiment according to the present invention will be described making reference to FIG. 3 and FIGS. 4a and 4b. FIG. 3 is a partial top view of a support grid 140 for a fuel assembly and a plurality of straps 150, 160 are similarly assembled in a crossed manner so as to define a plurality of grid cells 141 in a square arrangement. Moreover, the fuel rods 9 are individually placed through and resiliently supported in these grid cells 141 as shown by dash-and-two-dot lines. In FIGS. 4a and 4b, the blank shapes of the straps 150, 160 are partially shown. Describing the structure of the strap 150 by reference to FIG. 4a, slits 151 are formed along the upper side edge and each of them extends vertically in the drawing. Welding tabs 157, 159 are formed in a similar pattern. Mixing vanes 153, 155 are formed at both sides of the opening of alternate slits 151 and welding apertures 153a, 155a are defined in the base end of the vanes 153, 155 at either side of the slits 151. A gap 152 between the mixing vanes 153, 155 is slightly larger than that in the structure shown in FIGS. 2a and 2b. Moreover, at the bend lines 154 shown by dash-and-two-dot lines, the mixing vanes 153, 155 are bent in opposite directions, respectively, so as to be adjacent to the fuel rods 9 as shown in FIG. 3.

The structure of the straps 160 to be combined with the straps 150 is depicted in FIG. 4b. Slits 161 similar to the slits 151 are defined at intervals along the lower side edge of the strap 160. Moreover, welding tabs 167, 169 are protrudingly formed as in the strap 60. In alignment with the slits 161 corresponding to the slits 151 without the mixing vanes 153, 155, mixing vanes 163, 165 are protrudingly formed at the upper side edge of the strap 160. In addition, as apparent from a comparison of FIG. 4a with FIG. 4b, the mixing vanes 163, 165 are larger in length than the mixing vanes 153, 155. They are bent in opposite directions at bend lines 164 that are slanted to avoid the welding apertures 163a, 165a during assembly. This state is illustrated in FIG. 3.

The straps 150, 160 of the aforementioned structure are assembled to become the support grid 140 after the mixing vanes 153, 155, 163, 165 are bent from their blank state. In this situation, the mixing vanes 163, 165 slightly overlap adjacent grid cells 141 as shown in FIG. 3 while the mixing vanes 153, 155 do not overlap adjacent grid cells because the gap 152 is relatively large and so the assembly of the straps is not obstructed by the mixing vanes 153, 155.

The support grid 140 is also, in a way similar to one for the support grid 40, joined into a fuel assembly, which is loaded in a nuclear reactor core. During the operation of the nuclear reactor, the coolant flows upwards between the fuel rod 9 and the straps 150, 160 and a portion of the coolant impinges on the slanted or bent mixing vanes 153, 155, 163, 165 to be agitated, thereby promoting mixing. In the above-mentioned structure, since the length of the mixing vanes 163, 165 is larger than conventional ones, the total area of the projected plane of the mixing vanes 153, 155, 163, 165 becomes larger thereby making the coolant impinging surface larger than that in the prior art, increasing the effects of agitation and mixing.

As described above, according to the present invention, since the area of the slanted portion of the mixing vanes protrudingly formed at side edges of the straps constituting a support grid in a horizontal projected plane is increased by displacement of the bend line from which the slanted portion begins or the increased length of all the mixing vanes, the effects of agitation and mixing in the coolant can also be increased.

What is claimed is:

1. A support grid of a nuclear reactor fuel assembly wherein the support grid has a plurality of first straps which are made of thin metal plate in the shape of a strip, and a plurality of second straps which are made of thin metal plate in the shape of a strip, the first and second straps each provided with slits extending widthwise for receiving the other of the straps and assembled so as to receive opposite straps in the slits of each strap to cross each other and thereby form an eggcrate structure, mixing vanes integrally formed on a side edge of the first and second straps adjacent to an area where the straps cross and in alignment with a slit, each of the mixing vanes being slanted to be adjacent to a nuclear reactor fuel rod to be placed through a grid cell of the eggcrate structure, characterized in that the mixing vanes have a welding aperture formed in a base portion of the vane on either side of the slits, a bend line at which the slanted surface of the mixing vane begins inclines with respect to the longitudinal axis of the strap so as to avoid the welding aperture, the mixing vane length of the first strap being set to be larger than the mixing vane length of the second strap.

* * * * *